US012640999B2

(12) United States Patent
Rutkowski et al.

(10) Patent No.: US 12,640,999 B2
(45) Date of Patent: May 26, 2026

(54) NETWORK TRAFFIC MEASUREMENT AND CONTROL SYSTEM

(71) Applicant: Microsoft Technology Licensing, LLC, Redmond, WA (US)

(72) Inventors: Bradley Rutkowski, Woodinville, WA (US); Yu Chen, Suzhou (CN); Yehan Wang, Suzhou (CN); Jinyang Zhou, Suzhou (CN); Boyang Zheng, Suzhou (CN); Zhenguo Yang, Suzhou (CN); Todd Carlyle Luttinen, Redmond, WA (US); Jeffrey Kramer Mealiffe, Seattle, WA (US); Yuchao Dai, Suzhou (CN)

(73) Assignee: Microsoft Technology Licensing, LLC, Redmond, WA (US)

( * ) Notice: Subject to any disclaimer, the term of this patent is extended or adjusted under 35 U.S.C. 154(b) by 12 days.

(21) Appl. No.: 18/683,057

(22) PCT Filed: Jun. 30, 2022

(86) PCT No.: PCT/CN2022/102932
§ 371 (c)(1),
(2) Date: Feb. 12, 2024

(87) PCT Pub. No.: WO2024/000444
PCT Pub. Date: Jan. 4, 2024

(65) Prior Publication Data
US 2024/0356824 A1     Oct. 24, 2024

(51) Int. Cl.
H04L 43/026     (2022.01)
H04L 43/091     (2022.01)
H04L 47/24     (2022.01)

(52) U.S. Cl.
CPC .......... H04L 43/026 (2013.01); H04L 43/091 (2022.05); H04L 47/24 (2013.01)

(58) Field of Classification Search
CPC ... H04L 43/026; H04L 43/091; H04L 43/024; H04L 43/028; H04L 43/04; H04L 47/24
See application file for complete search history.

(56) References Cited

U.S. PATENT DOCUMENTS

2015/0236895 A1*  8/2015  Kay ..................... H04L 43/045
                                                        709/224
2015/0312117 A1  10/2015  Behera et al.
2015/0333992 A1  11/2015  Vasseur et al.
(Continued)

OTHER PUBLICATIONS

Chen, et al., "NetPanel: Traffic Measurement of Exchange Online Service", In Proceedings of the 20th USENIX Symposium on Networked Systems Design and Implementation, Apr. 2023, pp. 1541-1555.
(Continued)

*Primary Examiner* — Azizul Choudhury
(74) *Attorney, Agent, or Firm* — Schwegman Lundberg & Woessner, P.A.

(57)     ABSTRACT

A network traffic computing system obtains on-router traffic data, on-server traffic data and application log data. A data processing system extracts features from the data sources, splits the extracted features based upon destination and source ports and performs component-level aggregation of the features. The aggregated data is surfaced for monitoring and traffic control.

18 Claims, 11 Drawing Sheets

(56) References Cited

U.S. PATENT DOCUMENTS

2016/0142276 A1* 5/2016 Shomura ................. H04L 43/04
                                                              709/224
2017/0302553 A1  10/2017 Zafer et al.
2019/0114245 A1*  4/2019 Mermoud ........... G06F 11/3466
2021/0226866 A1*  7/2021 Vegas ................. H04L 43/0823

OTHER PUBLICATIONS

"About Event Tracing", Retrieved From: https://web.archive.org/web/20191206184549/https://docs.microsoft.com/en-us/windows/win32/etw/about-event-tracing, May 31, 2018, 3 Pages.
"Amazon CloudWatch", accessed on link https://aws.amazon.com/cloudwatch/, retrieved on https://aws.amazon.com/cloudwatch/, Jul. 8, 2024, 10 pages.
"Azure Data Explorer: a Big Data Analytics Cloud Platform Optimized for Interactive, Ad-Hoc Queries Over Structured, Semi-Structured and Unstructured Data", Retrieved From: https://azure.microsoft.com/mediahandler/files/resourcefiles/azure-data-explorer/Azure_Data_Explorer_white_paper.pdf, 2018, 16 Pages.
"Azure Status History", Retrieved From: https://status.azure.com/en-us/status/history, Retrieved from URL: Retrieved From: https://status.azure.com/en-us/status/history, Retrieved on Jul. 8, 2024, 10 Pages.
"Google Cloud Monitoring", Retrieved From: https://cloud.google.com/monitoring/, retrieved on Jun. 13, 2022, 10 Pages.
"Salesforce disruption: NA2 and next day, CS1", Retrieved From: http://iwgcr.org/salesforce-disruption/, retrieved on Jun. 16, 2022, 2 Pages.
"Service Health-Incident Affecting Google App Engine, Google Cloud Functions", Retrieved From: https://status.cloud.google.com/incidents/uaRinwS8pu2yyjdYbDaM, 2021, 2 Pages.
"Service Level Agreements (SLA) for Online Services", Retrieved From: https://www.microsoft.com/licensing/docs/view/Service-Level-Agreements-SLA-for-Online-Services, 2022, 132 Pages.
"TCPDUMP & LIBPCAP", Retrieved From: https://www.tcpdump.org/, retrieved on Jun. 16, 2022, 2 Pages.
"US-central1: Google app engine standard experiencing increased latency and pending queue aborted error request rate", accessed on link https://status.cloud.google.com/incidents/uaRinwS8pu2yyjdYbDaM, retrieved on Jul. 8, 2024, 2 pages.
Anwar, et al., "Anatomy of Cloud Monitoring and Metering: A Case Study and Open Problems", ACM 2015, 7 pages.
Ardelean, et al., "Performance Analysis of Cloud Applications", In Proceedings of 15th USENIX Symposium on Networked Systems Design and Implementation, 2018, pp. 405-417.
Bronzino, et al., "Traffic Refinery: Cost-Aware Data Representation for Machine Learning on Network Traffic", In Proceedings of the ACM on Measurement and Analysis of Computing Systems, vol. 5, Issue No. 3, 2021, 24 Pages.
Calder, et al., "Odin: Microsoft's Scalable Fault-Tolerant CDN Measurement System", In Proceedings of the 15th USENIX Symposium on Networked Systems Design and Implementation, Apr. 2018, pp. 501-517.
Claise, et al., "Cisco Systems NetFlow Services Export Version 9", In Journal of Request for Comments (RFC), vol. 3954, Oct. 2004, 33 Pages.
Claise, et al., "Specification of the IP Flow Information Export (IPFIX) Protocol for the Exchange of Flow Information", In Journal of Request for Comments (RFC), vol. 7011, Sep. 2013, 76 Pages.
Cruz, Acacio., "Update on Today's Gmail Outage", Retrieved From: https://gmail.googleblog.com/2009/02/update-on-todays-gmail-outage.html, Feb. 24, 2009, 2 Pages.
Deri, et al., "Increasing Data Center Network Visibility with Cisco NetFlow-Lite", In Proceedings of 7th International Conference on Network and Service Management, 2011, 8 Pages.
Fielding, Roy., "Architectural Styles and the Design of Network-based Software Architectures", Doctor of Philosophy, In Information and Computer Science, 2000, 180 pages.

Gunawi, et al., "Why Does the Cloud Stop Computing? Lessons from Hundreds of Service Outages", In Proceedings of the Seventh ACM Symposium on Cloud Computing, vol. 16, 2016, 16 Pages.
Hamed, et al., "A Modified Mann-Kendall Trend Test for Autocorrelated Data", In Journal of Hydrology, vol. 204, Issues No. 1, 1998, pp. 182-196.
Hofstede, et al., "Flow Monitoring Explained: From Packet Capture to Data Analysis with NetFlow and IPFIX", In Journal of IEEE Communications Surveys & Tutorials, vol. 16, Issue No. 4, 2014, pp. 2037-2064.
Hosseini, et al., "Greykite: A Flexible, Intuitive, and Fast Forecasting Library", Retrieved From: https://engineering.linkedin.com/blog/2021/greykite--a-flexible--intuitive--and-fast-forecasting-library, May 13, 2021, 13 Pages.
Huang, et al., "Gray Failure: The Achilles' Heel of Cloud-Scale Systems", In Proceedings of the ACM Workshop on Hot Topics in Operating Systems, May 2017, pp. 150-155.
International Search Report and Written Opinion received for PCT Application No. PCT/CN22/102932 Dec. 6, 2022, 14 pages.
Islam, et al., "Anomaly Detection in a Large-Scale Cloud Platform", In Proceedings of IEEE/ACM 43rd International Conference on Software Engineering: Software Engineering in Practice (ICSE-SEIP), 2021, pp. 150-159.
Jayaraman, et al., "Validating Datacenters at Scale", In Proceedings of the ACM Special Interest Group on Data Communication, vol. 19, 2019, pp. 200-213.
Kromkowski, et al., "Evaluating Statistical Models for Network Traffic Anomaly Detection", In Proceedings of Systems and Information Engineering Design Symposium (SIEDS), 2019, 2019, 6 Pages.
Li, et al., "FlowRadar: A Better NetFlow for Data Centers", In Proceedings of 13th USENIX Symposium on Networked Systems Design and Implementation, vol. 16, Mar. 2016, pp. 311-324.
Liu, et al., "One Sketch to Rule Them All: Rethinking Network Flow Monitoring with UnivMon", In Proceedings of the ACM SIGCOMM Conference, vol. 16, 2016, pp. 101-114.
Medina, Angelique., "AWS Outage Analysis: Dec. 15, 2021", Retrieved From: https://www.thousandeyes.com/blog/aws-outage-analysis-december-15-2021/, Dec. 15, 2021, 5 Pages.
Moshref, et al., "Trumpet: Timely and Precise Triggers in Data Centers", In Proceedings of the ACM SIGCOMM Conference, vol. 16, 2016, pp. 129-143.
Nichols, et al., "A Two-bit Differentiated Services Architecture for the Internet", In Journal of Request for Comments (RFC), vol. 2638, Jul. 1999, 26 Pages.
Nichols, et al., "Definition of the Differentiated Services Field (DS Field) in the IPV4 and IPV6 Headers", In Journal of Request for Comments (RFC), vol. 2474, Dec. 1998, 20 Pages.
Patel, et al., "Big Data Processing at Microsoft: Hyper Scale, Massive Complexity, and Minimal Cost", In Proceedings of the ACM Symposium on Cloud Computing, vol. 19, 2019 pp. 490-490.
Phaal, et al., "InMon Corporation's sFlow: A Method for Monitoring Traffic in Switched and Routed Networks", In Journal of Request for Comments (RFC), vol. 3176, Sep. 2001, 31 Pages.
Pourmajidi, et al., "Dogfooding: Using IBM Cloud Services to Monitor IBM Cloud Infrastructure", In Proceedings of the 29th Annual International Conference on Computer Science and Software Engineering, Nov. 2019, pp. 344-353.
Quittek, et al., "Requirements for IP Flow Information Export (IPFIX)", In Journal of Request for Comments (RFC), vol. 3917, Oct. 2004, 33 Pages.
Rasley, et al., "Planck: Millisecond-Scale Monitoring and Control for Commodity Networks", In Journal of ACM SIGCOMM Computer Communication Review, Aug. 2014, pp. 407-418.
Sekar, et al., Revisiting the Case for a Minimalist Approach for Network Flow Monitoring, In Proceedings of the 10th ACM SIGCOMM Conference on Internet Measurement, Nov. 2010, pp. 328-341.
Singh, et al., "Cost-Effective Cloud Edge Traffic Engineering with Cascara", In Proceedings of the 18th USENIX Symposium on Networked Systems Design and Implementation, Apr. 12, 2021, pp. 201-216.

(56)　　　　　References Cited

OTHER PUBLICATIONS

Tammana, et al., "Distributed Network Monitoring and Debugging with SwitchPointer", In Proceedings of 15th USENIX Symposium on Networked Systems Design and Implementation (NSDI), 2018, pp. 453-456.

Tammana, et al., "Simplifying Datacenter Network Debugging with PathDump", In Proceedings of The 12th USENIX Symposium on Operating Systems Design and Implementation, 2016, pp. 233-248.

Teixeira, et al., "PacketScope: Monitoring the Packet Lifecycle Inside a Switch", In Proceedings of the Symposium on SDN Research, 2020, pp. 76-82.

Tilmans, et al., "Stroboscope: Declarative Network Monitoring on a Budget", In Proceedings of 15th USENIX Symposium on Networked Systems Design and Implementation (NSDI), Apr. 2018, pp. 467-482.

Wei., et al., "Analysis farm: A cloud-based scalable aggregation and query platform for network log analysis", In Proceedings of International Conference on Cloud and Service Computing, 2011, pp. 354-359.

Wundsam, et al., "OFRewind: Enabling Record and Replay Troubleshooting for Networks", In Proceedings of the USENIX Annual Technical Conference, 2011, 14 Pages.

Xue, et al., "ROTOS: A Reconfigurable and Cost-Effective Architecture for High-Performance Optical Data Center Networks", In Journal of Lightwave Technology, vol. 38, Issue No. 13, Jul. 1, 2020, pp. 3485-3494.

Yang, et al., "Cost-Efficient Scheduling of Bulk Transfers in Inter-Datacenter WANs", In Proceedings of IEEE/ACM Transactions on Networking, vol. 27, Issue No. 5, Oct. 5, 2019, pp. 1973-1986.

Zhao, et al., "LightGuardian: A Full-Visibility, Lightweight, In-band Telemetry System Using Sketchlets", In Proceedings of 18th USENIX Symposium on Networked Systems Design and Implementation (NSDI), Apr. 2021, pp. 991-1010.

* cited by examiner

Source port ranking

| Source | Bytes |
|--------|-------|
| Port A | 199 |
| Port E3 | 98 |
| Port E4 | 97 |
| Port E5 | 96 |
| Port E6 | 95 |

Destination port ranking

| Source | Bytes |
|--------|-------|
| Port B | 194 |
| Port C | 192 |
| Port E1 | 100 |
| Port E2 | 99 |

Port pair ranking

| Source | Destination | Bytes |
|--------|-------------|-------|
| Port A | Port E1 | 100 |
| Port A | Port E2 | 99 |
| Port E3 | Port B | 98 |
| Port E4 | Port C | 97 |
| Port E5 | Port B | 96 |
| Port E6 | Port C | 95 |

FIG. 6

NETWORK TRAFFIC MEASUREMENT AND CONTROL SYSTEM

CROSS-REFERENCE TO RELATED APPLICATION

The present application is a Section 371 National State Application of and claims priority to International patent application Serial No. PCT/CN2022/102932, filed Jun. 30, 2022, and published in English the content of which is hereby incorporated by reference in its entirety.

BACKGROUND

Computing systems are currently in wide use. Some such computing systems are cloud-based computing systems or computing systems deployed in other remote server environments. Such computing systems may host applications or services that are accessed by a wide variety of different users. Some global cloud applications are composed of thousands of different components that each generate large volumes of network traffic.

In order to perform continuous traffic optimization control, a control system attempts to identify the contributors to the network traffic. However, identification of contributors to network traffic can be problematic. Some current systems attempt to use on-server traffic monitor systems, and other current systems attempt to use on-router traffic sampling systems.

The discussion above is merely provided for general background information and is not intended to be used as an aid in determining the scope of the claimed subject matter.

SUMMARY

A network traffic computing system obtains on-router traffic data, on-server traffic data and application log data. A data processing system extracts features from the data sources, splits the data based upon destination and source ports and performs component-level aggregation of the features. The aggregated data is used in monitoring and traffic control.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIG. 6 shows one example of data splitting.

DETAILED DESCRIPTION

Figure 1:
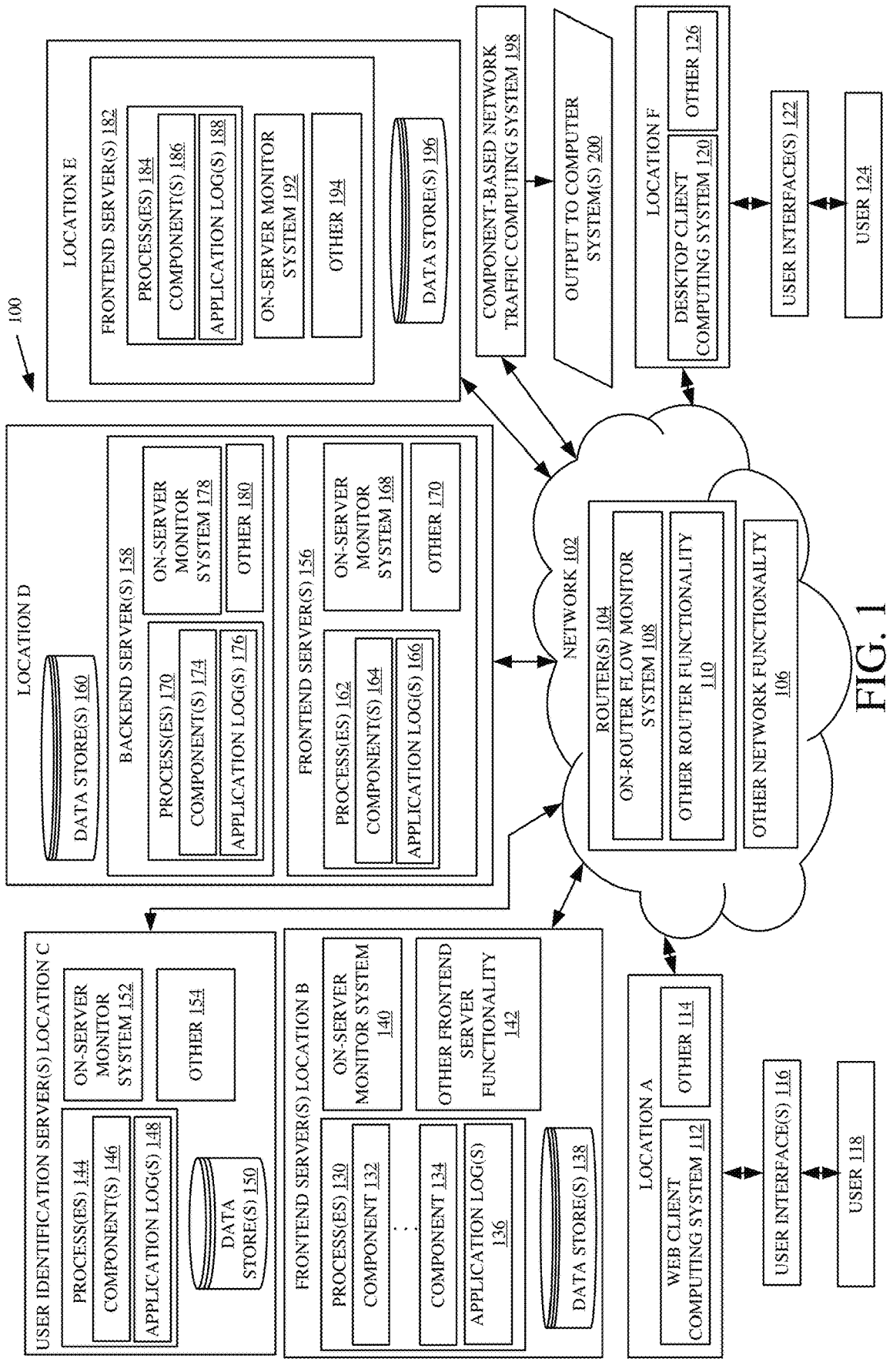
FIG. 1 is a block diagram of one example of a computing system architecture.

As discussed above, some computing systems use many components that each generate large volumes of network traffic. In order to preform network traffic optimization, the contributors to the network traffic are to be identified.

There are currently monitors that monitor network traffic for incidents and performance regressions and these types of monitors are based on availability or latency metrics which are generally insensitive to some types of traffic issues. For instance, because global cloud applications are often composed of many components developed and maintained by engineers from various teams, and because such components are sending a very large volume of traffic across data centers worldwide, any small defect or bug in even a single component may lead to large increases in internal traffic (traffic between components of the application). In addition, due to the large number of components in such applications, the shared bandwidth, which is shared among those components, can be easily consumed by low-priority traffic. These types of traffic issues can result in customers suffering long latency or even connection loss. Many current traffic monitors and performance analysis monitors are insensitive to these types of traffic issues.

Thus, unnecessary traffic may still be caused by hidden issues such as code bugs or configuration errors. Over time, these hidden issues may become extremely difficult to trace and may simply be accepted as necessary bandwidth requirements.

To accomplish network traffic optimization traffic measurements should be known at the component level. A component is, as one example, a set of service functionality that is maintained as a single unit, such as by a single engineering team. On-router monitor systems cannot identify components in the application layer of a computing system. Other monitor systems are on-server network analysis tools. These tools also cannot identify component-level traffic. Instead, the on-server types of tools can only observe the process that is sending the traffic, but multiple components can share a single process. The on-server monitoring tools cannot distinguish between traffic emitted from different components of a single service.

Further, to perform quick traffic control, the measurement data should be controlled to maintain low latency in querying the results. For instance, in order to draw an effective conclusion with respect to the measurement results, the results are often queried over relatively large time intervals. However, global cloud applications are constantly generating vast amounts of traffic data. For instance, some on-router monitors may measure more than 10 terabytes of traffic per day. On-server monitors and application logs may generate data on the order of petabytes per day. Running queries on these types of data sources may introduce an unacceptable latency. Further generation of measurement data in a production environment can consume large amounts of computing system resources so that the global application may not meet customer expectations.

The present description thus proceeds with respect to a data generated by on-server monitors, on-router monitors, and application logs to distinguish between traffic contributed by different components and to obtain component-level measurement results. The data size is reduced by performing feature extraction, data splitting and data aggregation so that results are relatively small (such as on the order of gigabytes per day). In addition, in order to reduce resource consumption in generating the measurement data, the data generation may be restricted to obtaining data from the top k ports, in terms of traffic volume.

In one example deployment, the present system was deployed on a global application architecture and generated a negligible impact on production servers (less than 1% increase in CPU and disk I/O operation). Further, the data processing cost utilized less than 0.01% of the processing cores utilized by the application. For user queries in which the traffic measurement data generated over a 60 day period was queried, the response was returned within 30 seconds. This is just one example of the results of an actual deployment.

FIG. 1 is a block diagram of one example of a computing system architecture 100 in which a large scale electronic mail (email) application is hosted by servers and processes that are located in a variety of different geographic locations. The geographic locations shown in FIG. 1 are labeled location A through location F. The systems in locations A-F can communicate with one another over network 102. Network 102 can include a plurality of different routers 104 and other network functionality 106. Each network may include an on-router flow monitor system 108 and other router functionality 110. The on-router flow monitor system may sample the traffic and traffic level that passes through router 102 and store that data as on-router traffic flow data. The on-router traffic flow data is described in greater detail below. Network 102 may thus be a wide area network (such as the internet) or a local area network, or a cellular communication network, or other networks or combinations of networks.

In the example shown in FIG. 1, location A includes a web client computing system 112 and other items 114. Web client computing system 112 can generate interfaces 116 for interaction by user 118. User 118 may interact with user interfaces 116 in order to control and manipulate web client computing system 112 and other portions of the computing system architecture 100.

FIG. 1 also shows that, at location F, a desktop client computing system 120 can generate interfaces 122 for interaction by user 124. User 124 interacts with user interfaces 122 in order to control and manipulate desktop client computing system 120 and other portions of computing system architecture 100. Location F can of course include other items 126 as well.

In the example shown in FIG. 1, the large scale electronic mail application may be implemented using servers having different roles, such as frontend servers, backend servers, and user identification servers in a variety of different locations. The frontend servers expose in interface that can be used to serve customer requests over direct connections. The user identification server holds user, mailbox, and other customer metadata that is used to identify the different users, the locations of their mailboxes, etc. The backend servers provide storage for mailboxes and are responsible for delivery of electronic mail messages to and from those mailboxes. Multiple copies of user mailboxes may be geographically dispersed across architecture 100 to provide high availability. Each role of servers (frontend servers, backend servers and user identification servers) host a group of services in order to provide desired functionality.

More specifically with respect to the architecture 100 shown in FIG. 1, location B includes a set of frontend servers that have processes 130 disposed thereon. Each process may have a plurality of different components 132-134 and a set of application logs 136 that store application log data. A set of data stores 138 may also be provided at location B. On-server monitor system 140 performs traffic monitoring on the frontend servers at location B. The frontend servers can also include a wide variety of other frontend server functionality 142.

Location C includes a set of user identification servers which can serve requests for user and mailbox metadata. The servers use a plurality of different processes 144, each of which may have a plurality of different components 146 and application logs 148. A set of data stores 150 can also be deployed at location C, along with an on-server monitor system 152, and other user identification server functionality 154.

Location D includes both a set of frontend servers 156 and a set of backend servers 158, as well as one or more data stores 160. Frontend servers 156 can include a set of processes 162, which may have multiple components 164 and application logs 166. Frontend servers 156 may also have on-server monitor system 168 and other functionality 170. Backend servers 158 may include a set of processes 172, each of which may have a plurality of components 174, as well as application logs 176. Backend servers 158 may include on-server monitor system 178 and other items 180. In the example shown in FIG. 1, location E includes a set of backend servers 182 which may include one or more processes 184, each of which may have a plurality of components 186, and application logs 188. Backend servers 182 may include on-server monitor system 192, and other items 194. Location E may also include one or more data stores 196.

Component-based network traffic computing system 198 can obtain network traffic data from a variety of different data sources (such as the on-server monitor systems 140, 152, 168, 178, and 192, the on-router flow monitor system 108, application logs 136, 148, 166, 176, and 188, as well as other data sources) and generate a result data store of traffic measurement results. Those results, or a representations of those results, may be provided as an output 200 to other computer systems. Component-based network traffic computing system 198 is described in greater detail below with respect to FIG. 2.

In order to provide an example of how traffic is generated in the computing system architecture 100 shown in FIG. 1, a brief discussion of one example traffic flow will now be provided. In one example, user 124 sends an electronic mail (email) message to user 118 using the email system implemented in architecture 100 and using a desktop email component on desktop client computing system 120. User 118 then reads the email through an email component on web client computing system 112. The email message is sent from desktop client computing system 120 to the mailbox of user 118 maintained by backend server 182 in data store 196 at location E. However, in the scenario being described, the mailbox is replicated to location D in order to maintain high availability. Later, user 118 reads the email message from the mailbox in location D. In reading the email message, there are four steps in the email-reading process that generate traffic. Those steps are as follows.

Step 1: User 118 uses web client computing system 112 in location A to send a request for the email message to the closest frontend server. For purposes of the present discussion, it will be assumed that the closest frontend server is the frontend server located at location B.

Step 2: The frontend server at location B communicates with the user identification servers in location C to determine which backend server has information that would identify the backend server that hosts an active copy of the mailbox for the user 118. The backend server deployed in location D is returned by the user identification servers in location C to the frontend server at location B.

Step 3: The frontend server at location B then queries the backend server in location D to ask which backend server hosts the mailbox for user 118. In the present example, it is assumed that the backend server in location D hosts the mailbox for user 118 so it responds identifying itself.

Step 4: The frontend server at location B then forwards the request from user 118 to the backend server at location D and the response from the backend server at location D is returned to user 118 in the opposite direction discussed above with respect to steps 1 and 4.

In one example, a component is, a functionally independent unit of functionality in a service that is deployed as a process or as a part of a process and is owned (maintained by) a single engineering team. One example of a component includes REST. A component performs a function and may receive some input and/or produce an output. FIG. 1 shows that, in some cases, multiple components provide services through the same process. For instance, in step 1, a representational state transfer (REST) protocol service (which is a component) running on an internet information service (IIS) at location B handles the request of user 118 on the frontend servers on location B. The IIS process (e.g., process 130) holds multiple protocols including REST, desktop, etc. These protocols may be selected based upon the client that is being used. Thus, multiple components 132-134 are running on a single process 130.

The on-router flow monitor system 108 samples packets with a certain probability and aggregates them into flows. In the present example, a flow is a sequence of packets with the same internet protocol 5-tuples which include: source/destination IP address, source/destination port, and protocol. Each flow is loaded by the on-router flow monitor system 108 into a centralized data store which may be located in system 108 or elsewhere.

The on-server monitor systems 140, 152, 168, 178, and 192, monitor the traffic usage of all processes on a particular machine. The results are also uploaded to the centralized data store. Thus, the on-router flow monitor system 108 collects traffic data on routers 104 while the on-server monitor systems collect system network events and provide traffic statistics for processes on servers.

The application logs 136, 148, 166, 176, and 188 are generated within the services and may be shared by the different engineering teams that debug the corresponding components. For each request that is logged by the application logs, the application logs store a record that includes the timestamp of the request, the particular component that serves the request, the local server name, the remote server name, the latency, the request and response sizes, the remote port that is used for the request, among other things. The measurement capabilities of each of these three sources of information (the on-router flow monitor system 108, the on-server monitor systems, and the application logs, are summarized in Table 1 below.

TABLE 1

| | Time-stamp | IP Pair | Port Pair | DSCP | Process | Com-ponent | Traffic Size |
|---|---|---|---|---|---|---|---|
| On-Router Flow Monitor System | √ | √ | √ | √ | x | x | √ |
| On-Server Monitor System | √ | √ | √ | x | √ | x | √ |
| Application Logs | √ | √ | √ | x | √ | √ | x |

The checkmark in Table 1 indicates that the corresponding monitor system or application log collects the information while the X's indicate that the system or application log does not collect the information. In Table 1, the timestamp, and IP address pair (source and destination) and a port pair (source/destination) identify a unique flow. A differentiated services code point (DSCP) tag is used by a bandwidth broker for traffic quality of service classification. Packets with different DSCP tags are classified to different priority traffic tiers. The process entry identifies the processes that are sending and receiving the traffic. The on-router flow monitor system 108 obtains the IP address, port, identifier DSCP, and traffic size, but cannot obtain the process and component information which are available only on the servers. The on-server monitor systems 140, 152, 168, 178, and 192 obtain the timestamp, IP address and port identifier as well as the process identifier and traffic size, but cannot obtain the DSCP tag. While the on-server monitor systems identify the processes, they cannot identify exact components when many components share the same process. The application logs 136, 148, 166, 176, and 188 obtain all of the information except the DSCP tags and the exact traffic size. The application logs 136, 148, 166, 176, and 188 can be used to obtain the request and response sizes of services, but not the sizes of the request headers.

Figure 2:
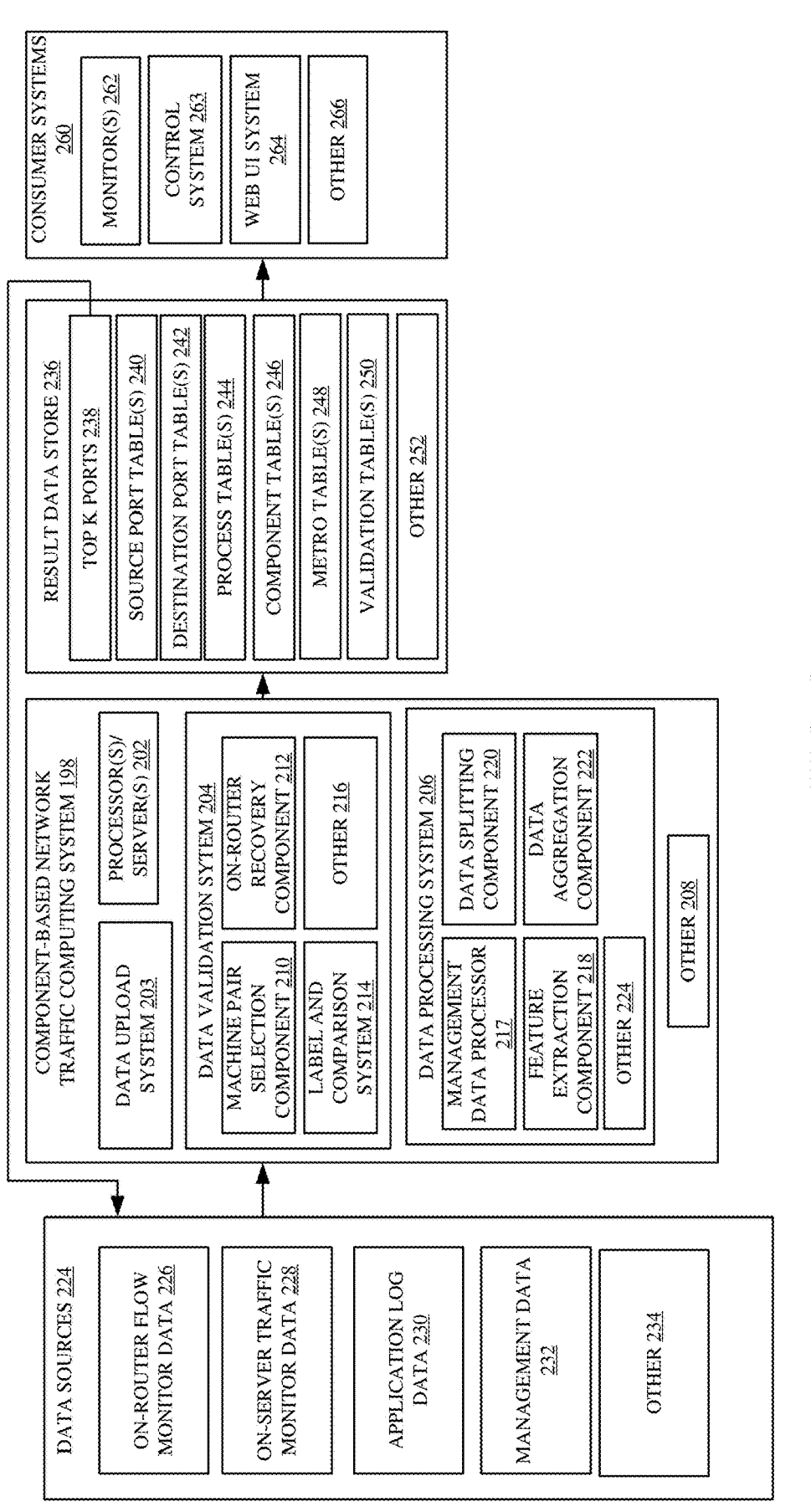
FIG. 2 is a block diagram showing one example of a network traffic computing system, in more detail.

FIG. 2 is a block diagram showing one example of network traffic component system 198 in more detail. In the example shown in FIG. 2, system 198 includes one or more processors or servers 202, data upload system 203, data validation system 204, data processing system 206, and other items 208. Data validation system 204 includes machine pair selection component 210, data filter 212, label and comparison system 214, and other items 216. Data processing system 206 includes management data processor 217, feature extraction component 218, data splitting component 220, data aggregation component 222, and other items 224.

System 198 is shown in FIG. 2 accessing data from data sources 224. The data sources 224 can include on-router traffic flow monitor data 226 that is generated from on-router flow monitor system 108. Data sources 224 can also include on-server traffic monitor data 228 that is generated by the on-server monitor systems 140, 152, 168, 178, and 192. Data sources 224 can also include application log data 230 generated from application logs 136, 148, 166, 176, and 188. The data sources 224 can also include management data 232 and other data 234. The on-router traffic monitor data 226 may include the data from the on-router flow monitor system as shown in Table 1 above. The on-server traffic monitor data 228 may be the data stored by the on-server monitor system shown in Table 1, and the application log data 230 may be the data generated in the application logs as shown in Table 1. Management data 232 illustratively includes the location and server role corresponding to an IP address. The server role may indicate that the server is a frontend server, a backend server, or a user identification server.

The data from data sources 224 may be uploaded by data upload system 203 in component-based network traffic computing system 198 intermittently, such as on an hourly basis, or otherwise. The data may be uploaded into a distributed data storage and processing system or to a local data store, or in other ways. The data is illustratively converted into a uniform format such as that shown in Table 1 above. Also, the different types of data may be uploaded at different intervals. For instance, since the management data 232 is relatively static, relative to the other data in data sources 224, it may be that management data 232 is only updated daily, or at a different interval. Network traffic component system 198 processes the sources of data in data sources 224 independently, and stores aggregation and other processing results in a result data store 236. Result data store 236 illustratively stores an identifier of the top K ports (the K ports having the most traffic), a set of source port tables 240, a set of destination port tables 242, process tables 244, component tables 246, local traffic tables 248, validation tables 250, and there may be other tables or information 252 as well. The schema corresponding to some of the tables in result data store 236 is shown below with respect to Table 2.

TABLE 2

| Table | Data Source | Schema |
|---|---|---|
| Source/Destination Port | On-Router Flow Monitor Data | TimeStamp, ServiceRole, RateRegion, Port, DSCP, TrafficSize |
| Process | On-Server Monitor Data | TimeStamp, ServerRole, RateRegion, Port, Process, TrafficSize |
| Component | Application Logs | TimeStamp, ServerRole, RateRegion, Port, Process, Component, TrafficSize |

It can be seen in Table 2 that the source and destination port tables 240 and 242, respectively, are obtained from the on-router traffic monitor data 226. The schema for those tables includes Timestamp, ServerRole, RateRegion, Port, DSCP tag, and TrafficSize. The process tables are obtained from the on-server traffic monitor data 228 and include Timestamp, ServerRole, RateRegion, Port, Process, and TrafficSize. The component tables 246 are obtained from the application log data 230 and include Timestamp, ServerRole, RateRegion, Port, Process, Component, and TrafficSize. The metro tables 248 and validation tables 250 are discussed in greater detail below and are used with respect to data validation which increases the likelihood that data integrity is being maintained.

Result data store 236 is output to computer consumer systems 260 which consume the information in result data store 236. The consumer systems 260 can include monitor(s) 262, control system(s) 263, a web user interface system 264, and any of a wide variety of other consumer systems 266.

Figure 3A:
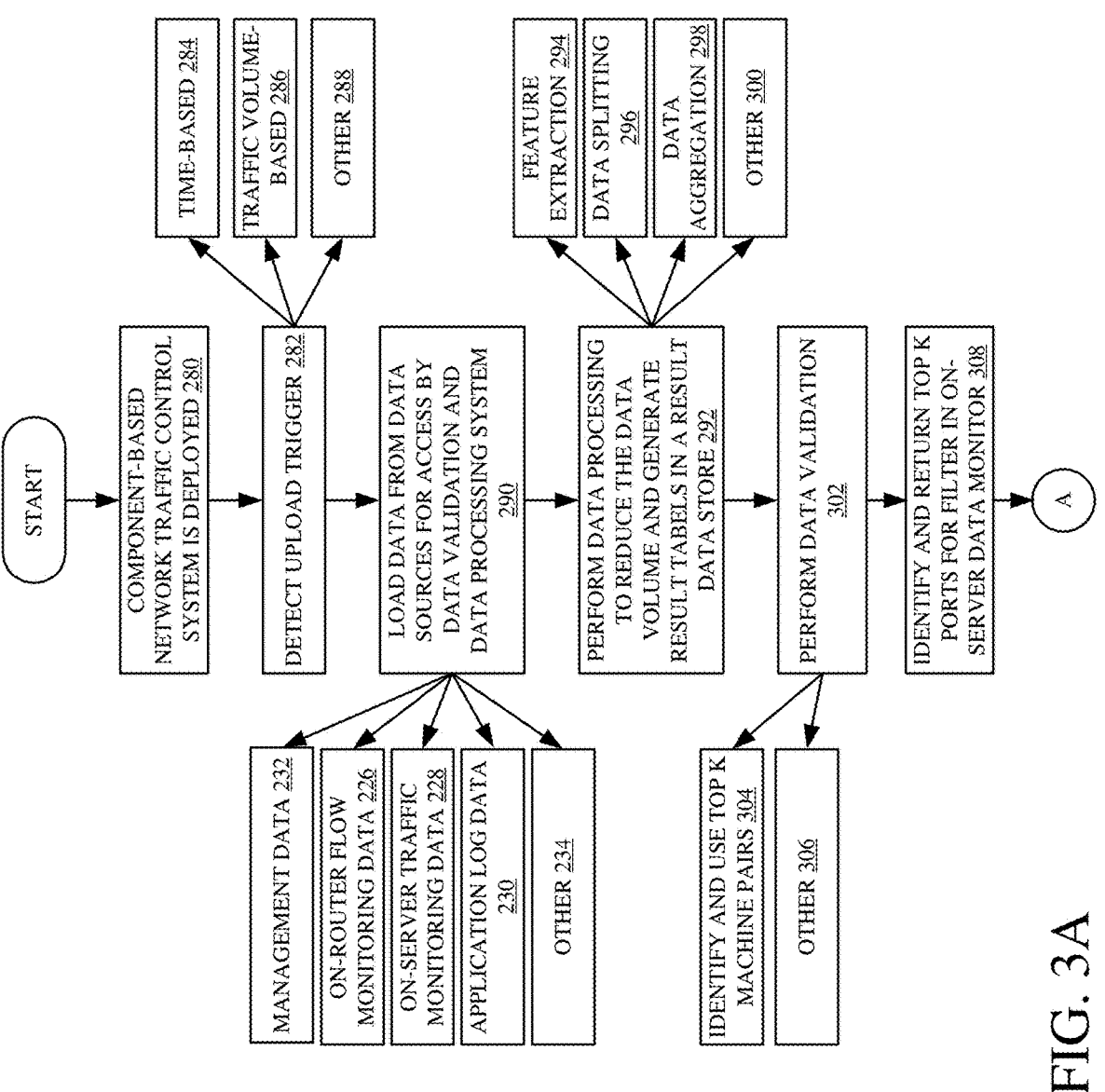
FIGS. 3A and 3B (collectively referred to herein as FIG. 3) show a flow diagram illustrating one example of the overall operation of network traffic computing system.
Figure 3B:
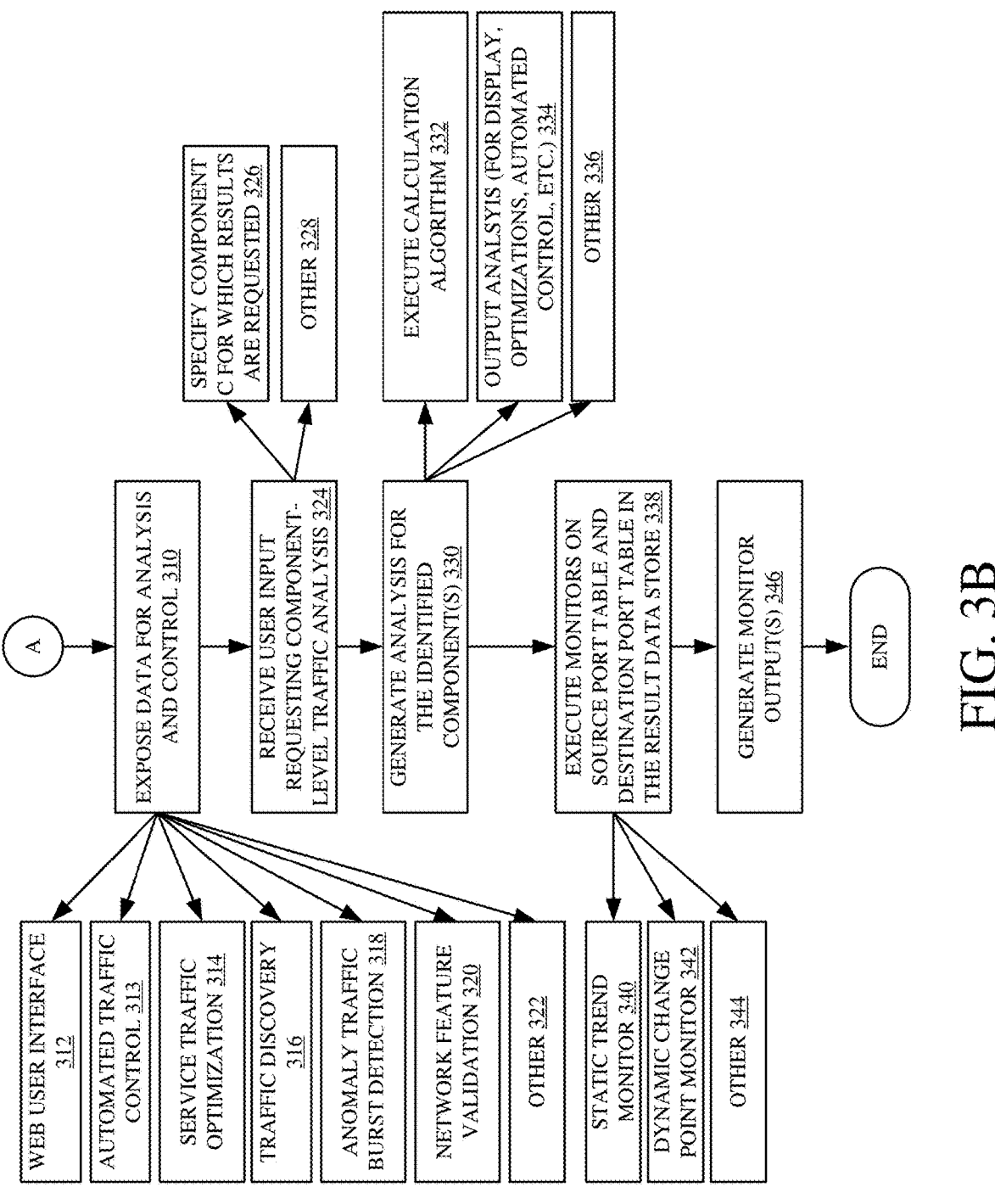
Figure 3C:
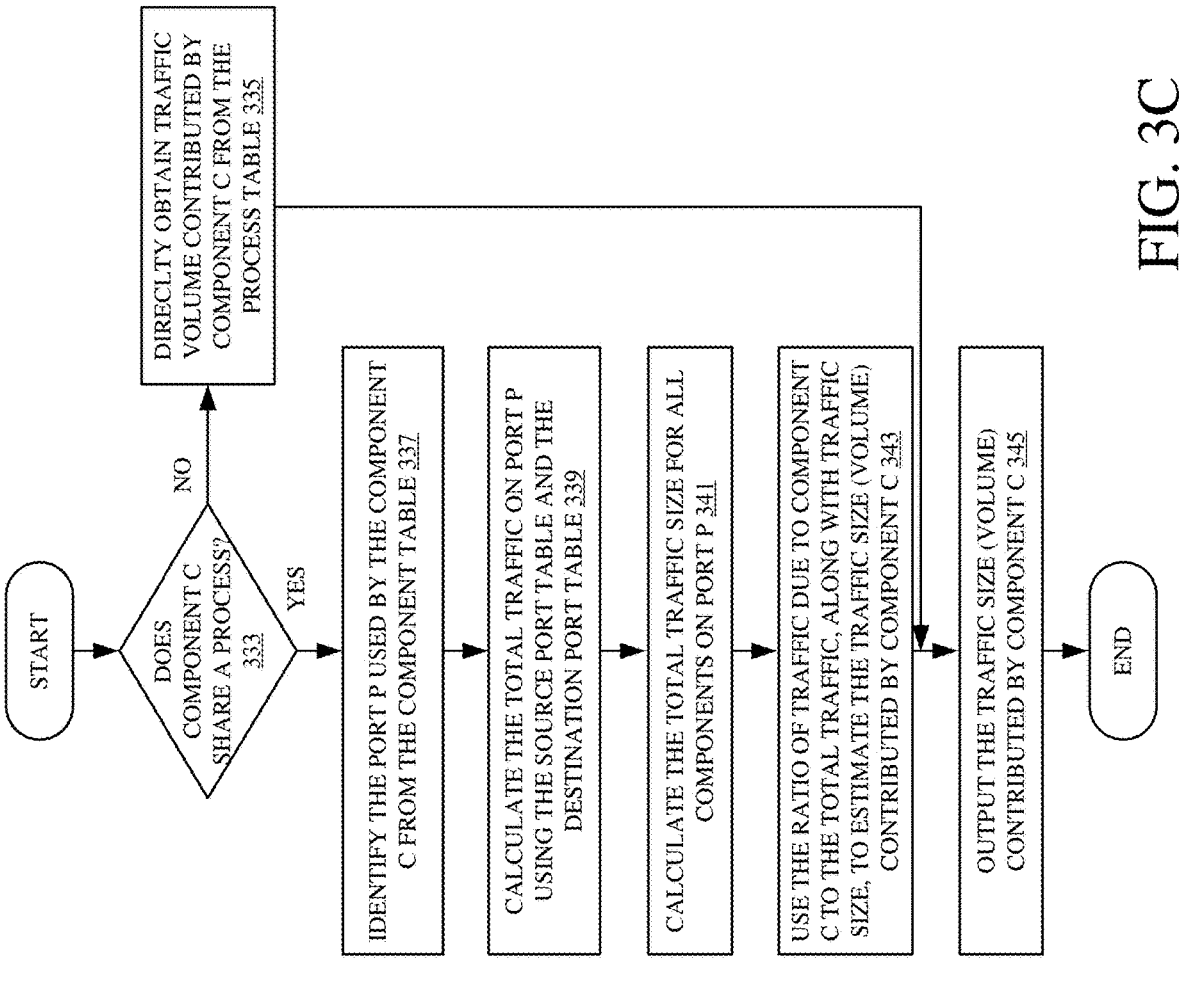
FIG. 3C is a flow diagram showing one example of how traffic size is generated on a component level.

FIG. 3 is a flow diagram illustrating one example of the overall operation of component-based network traffic computing system 198. It is first assumed that the component-based network traffic computing system 198 is deployed in a computing system architecture 100 to generate the component-based traffic metrics that are used for control and other operations. Having the component-based network traffic control system deployed is indicated by block 280 in the flow diagram of FIG. 3. At some point, data upload system 203 detects a trigger indicating that it should upload data from data sources 224. Detecting the upload trigger is indicated by block 282 in the flow diagram of FIG. 3. The trigger may be a time-based trigger in which case elapsed time indicates when data should be uploaded from data sources 224. The time-based trigger is indicated by block 284 in the flow diagram of FIG. 3. The trigger may be an indication from the data sources themselves indicating that a particular threshold volume of data has been collected by the data sources, at which point the data will be uploaded. Detecting a trigger as a traffic volume trigger is indicated by block 286 in the flow diagram of FIG. 3. The trigger can be a wide variety of other triggers as well, as indicated by block 288.

Data upload system 203 then loads the data from the data sources 224 so that the data is accessible by data validation system 204 and data processing system 206, as indicated by block 290 in the flow diagram of FIG. 3. Again, the data can be management data 232, on-router flow monitor data 226, on-server traffic monitor data 228, application log data 230, and other data 234.

Data processing system 206 then performs data processing on the data in order to reduce the data volume and generate result tables in the result data store 236. Performing data processing is indicated by block 292 in the flow diagram of FIG. 3. The data processing can include feature extraction 294 performed by feature extraction component 218. The data processing can also include data splitting 296 performed by data splitting component 220, and data aggregation 298 performed by data aggregation component 222. The data processing can include other operations 300 as well. Data processing is described in greater detail below with respect to FIG. 4.

Data validation system 204 also performs data validation, as indicated by block 302. Because of the complexity of data system architecture 100, there is a relatively high possibility that data loss can occur. Any control performed on incorrect data may lead to unintended consequences. Therefore, data validation system 204 performs data validation. The data validation system also identifies the top K machine pairs in terms of traffic volume as indicated by block 304 and can perform other operations 306 as well. Data validation is described in greater detail below with respect to FIG. 5.

The top K ports 238 are identified using aggregated on-router measurement data. The top K pairs are also returned to the on-server monitor systems so that the top K ports can be used as a filter to only monitor data from the top K ports. Returning the top K ports to filter the on-server data monitors is indicated by block 308. Filtering in this way reduces the amount of computing system resources that are required in order to generate data sources 224.

The result tables in result data store 236 are then provided to consumer systems 260 where it can be exposed for analysis and control, as indicated by block 310. In one example, the consumer systems 260 include a web UI system 264 which exposes a web user interface 312. The web user interface 312 exposes the information in result data store 236 to users, such as engineers. In another example, control system 263 can perform traffic optimization 314 based upon the information in result data store 236. The data can be used to perform traffic discovery, in order to identify the component-level contributions to the network traffic, as indicated by block 316. The data can be used to identify anomaly traffic bursts 318 and to validate network features, network configurations, and other controllable items on the network, as indicated by block 320. The data can be exposed for analysis and control in other ways as well, as indicated by block 322.

In one example, the web user interface 312 is a dashboard that provides engineers, other users, or automated control systems, a way to analyze the traffic. In one example, a user or an automated system can provide an input requesting component-level traffic analysis or metrics, as indicated by block 324. The request may specify a particular component C for which results are requested, as indicated by block 326. The request may be received through the web UI 264 in other ways as well, as indicated by block 328.

Web user interface system 264 can then generate analysis for the identified components, as indicated by block 330. In doing so, web user interface system 264 can execute a calculation algorithm as described below in Table 3, and as indicated by block 332 in the flow diagram of FIG. 3 and in more detail in FIG. 3C.

TABLE 3

Calculation Algorithm

```
Input: Component C
Output: TrafficSize
1 if Process Contains C then
2 |        return TrafficSize = Process[C]
3 else
4 |        P = Component[C].RemotePort
5 |        PortTraffic = SourcePort[P] + DestinationPort[P]
6 |        return TrafficSize =
7 |        Component[C, P]/Component[P] * PortTraffic
8 end
```

In Table 3, the algorithm receives an input identifying a component (component C) and the output is a value "TrafficSize" which identifies the traffic volume over a specified period contributed by component C. The steps to take in identifying the traffic size depends on whether the component C shares a process with other components. In line 1 and 2 of the algorithm (and blocks 333 and 335 in FIG. 3C), when a component monopolizes a process, the traffic for the component can be directly observed in the process table. If a component shares a process with other components, then lines 4-7 are executed to estimate the network traffic contributed by that component. In line 4 (and block 337 in FIG. 3C, the remote port number P is identified, that is used by component C. The remote port P is obtained from the component table. Then, in line 5 of the algorithm (and block 339 in FIG. 3C), the total traffic is calculated for port P, using the source port table and destination port table. In lines 6 and 7 of the algorithm (and at block 341 in FIG. 3C), the total request and response size of all components with remote port P is calculated using Equation 1 below.

$$\text{Component}[P] = \sum_c \text{Component}[c, P] \qquad \text{EQ. 1}$$

Is used to estimate the total request and response size of all components with remote port P. The ratio between component [C, P] to component [P], together with the port traffic are used (as identified by block 343 in FIG. 3C) in order to estimate the traffic size of component C and generate an output (as indicated by block 345 in FIG. 3C).

Figure 7:
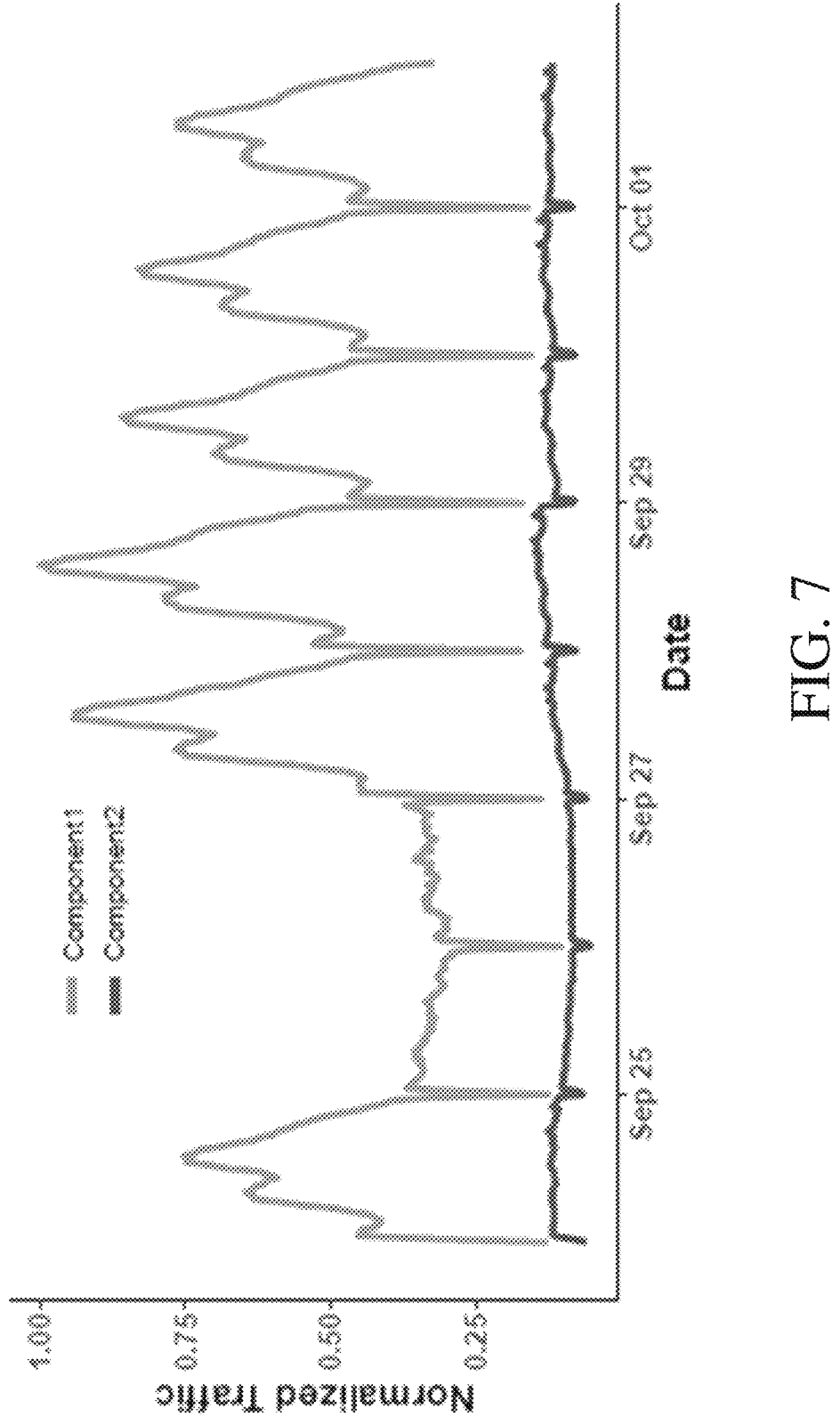
FIG. 7 shows one example of displayed traffic measurements.

The results of the analysis can then be output in a wide variety of different ways, as indicated by block 334 in the flow diagram of FIG. 3. One example of such an output is shown in FIG. 7 below. FIG. 7 shows an output for a particular period of time that identifies the normalized traffic level for two different components (labeled component 1 and component 2 in FIG. 7). Of course, the output shown in FIG. 7 is just one way for outputting the analysis results, and the analysis can be generated for identified components and output in a wide variety other ways as well, as indicated by block 336 in the flow diagram of FIG. 3.

Also, in one example, monitors 262 monitor the source port table and destination port table in result data store 236 for overall traffic usage of the application deployed in the computing system architecture 100. Executing these monitors is indicated by block 338 in the flow diagram of FIG. 3. In one example, monitors 262 include a static trend monitor 340 and a dynamic change point monitor 342. The static trend monitor 340 may generate an output that indicates such things as whether a feature rollout in the computer system architecture 100 generates suboptimal traffic. The dynamic change point monitor 342 can be used to discover sudden bursts in traffic which may be caused by such things as code regression or configuration errors. These of course are examples only and other monitors 344 can be used as well. Monitors 262 then generate a monitor output, as indicated by block 346. The output can be provided to a user (such as an engineer), to an automated system, or in other ways.

Figure 4:
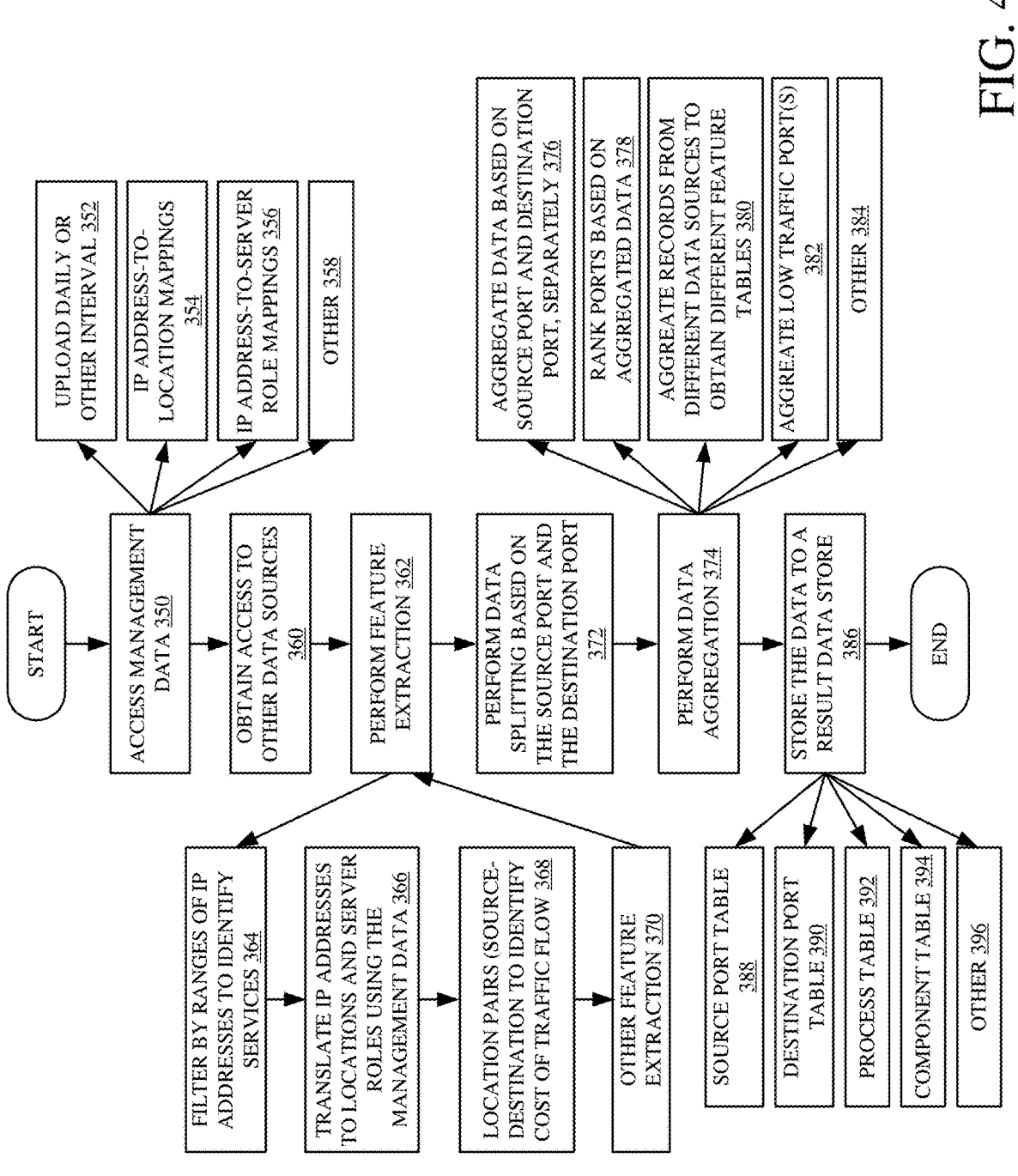
FIG. 4 is a flow diagram showing one example of data processing used in the network traffic computing system.

FIG. 4 is a flow diagram illustrating one example of the operation of data processing system 206, in more detail. Management data processor 217 first accesses management data 232, as indicated by block 350 in the flow diagram of FIG. 4. The management data is relatively static so it may be uploaded daily or at another interval, as indicated by block 352. The management data is processed to obtain an IP address-to-location map that maps different IP addresses to different locations in the architecture 100. Obtaining the IP address-to-location mappings is indicated by block 354 in the flow diagram of FIG. 4. The management data is also processed to obtain an IP address-to-server role mapping that maps the IP addresses to the different server roles (such as the backend role, the frontend role, the user identification role, etc.), as indicated by block 356. The management data 232 can be processed in other ways to obtain other items as well, as indicated by block 358.

Data processing system 206 then obtains access to the other data sources 224, as indicated by 360 in the flow diagram of FIG. 4. Feature extraction component 218 then performs feature extraction on the data, as indicated by block 362 in FIG. 4. The feature extraction component filters the data by ranges of IP addresses in order to identify the services corresponding to the data, as indicated by block 364.

Feature extraction component 218 then translates the IP addresses to locations and server roles using the management data, as indicated by block 366. Feature extraction component 218 uses the location pairs (source-destination pairs) to identify the cost of traffic flow, as indicated by block 368. Longer distance between the source and destination corresponds to a higher cost of the traffic. In one example, a cost feature (referred to herein as a RateRegion feature) replaces the location pair of a flow. The RateRegions may correspond to flows traveling over a geographical continent, across an ocean, locally within an organization, or over a different geographical distance. In one example, there are approximately ten RateRegions and translating the location pairs into the ten RateRegions greatly reduces the data size, and in some examples may reduce the data size by over 99%. Other features can be extracted as well, as indicted by block 370 in the flow diagram of FIG. 4.

Data splitting component 220 then performs data splitting based on the source port and the destination port in the source-destination port pairs. Splitting the data in this way also reduces the size of the data by turning a product relationship among sources and destinations into a sum relationship. Also, the data splitting surfaces highly used ports by ranking the split data because the traffic of low usage ports will converge to smaller volume values after aggregation. FIG. 6, for instance, shows how port rankings are split into source port rankings and destination port rankings. Performing data splitting is indicated by block 372 in the flow diagram of FIG. 4.

Data aggregation component 222 then performs data aggregation, as indicated by block 374. In one example, the data is aggregated based on source port and destination port, separately, as shown in FIG. 6 and as indicated by block 376 in the flow diagram of FIG. 4. Data aggregation component 222 then ranks the ports based upon the aggregated data, as indicated by block 378. The records from different data sources can be aggregated to obtain different feature tables (such as tables described above with respect to Table 2), as indicated by block 380. The on-server traffic monitor data 228 can be used to generate the process table. The application log data 230 can be used to generate the component table. The on-router flow monitor data 226 can be used to generate the source port table and destination port table. The data can be aggregated based on the timestamp information, such as in 5 minute intervals or other intervals. Traffic size is generated using an aggregated sum operation for the records with the same keys. For the purposes of the present discussion, the keys can be comprised of the columns, other than traffic size, in each table. Thus, for the source port table, the timestamp, ServerRole, RateRegion, port and DSCP comprises the key. It can also be noted that the traffic size in the component table may be comprised of the sum of the request and response sizes.

It has been observed that a relatively small number of ports dominate the total traffic usage in the network. Therefore, data aggregation component 222 also aggregates the low volume ports in the source port table and the destination port table. For each time slot, for example, all ports that contributed less than 1% of the total traffic to a particular record in the table can be aggregated and marked with a tag, to reduce overall data size (or log costs). The particular threshold (e.g., 1%) can be changed in order to change the overall data size (or log cost). Aggregating the low traffic ports is indicated by block 382 in the flow diagram of FIG. 4. Other aggregations can be performed as well, as indicated by block 384.

After the data in the data sources 224 is processed by data processing system 206, data processing system 206 stores the data to result data store 236, as indicated by block 386 in the flow diagram of FIG. 4. As discussed above, among other tables, the tables can include a source port table 388, a destination port table 390, a process table 392, a component table 394, or other tables 396.

Figure 5:
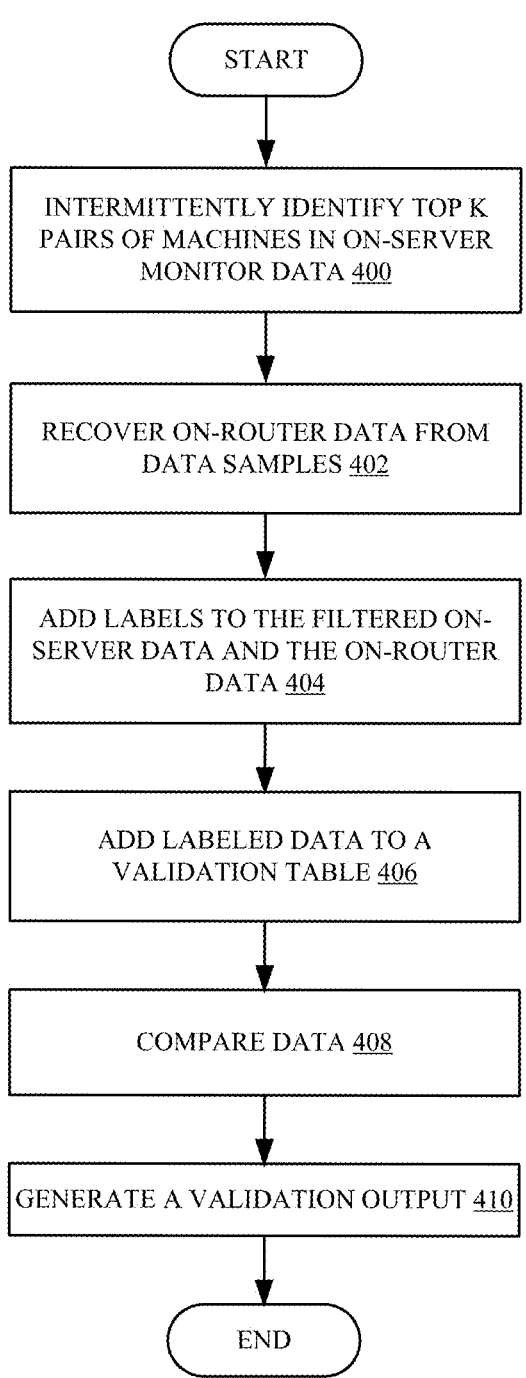
FIG. 5 is a flow diagram illustrating one example of performing data validation.

FIG. 5 is a flow diagram illustrating one example of the operation of data validation system 204. In one example, data validation system 204 cross validates the on-server traffic monitor data 228 with the on-router flow monitor data 226 because those two items of data should match one another. However, because the on-router flow monitor system 108 samples the traffic, while the on-server monitor systems count all traffic, the on-router traffic data must be recovered (the additional data in addition to the sample data) before comparing the two sources of data 226 and 228.

Given a pair of machines that continuously send high levels of traffic to one another, an effective estimation of the on-router data is close to the on-server data. The present description does not use application logs in order to validate the traffic size, because application logs typically capture the content sizes of the request and responses without capturing the headers.

The on-router data recovery component 212 performs recovery of the on-router data using Equation 2 below.

$$\text{On–Router Bytes} = \frac{(PacketSize + HeaderSize) * PacketNumber}{SamplingRate} \quad \text{EQ. 2}$$

In Equation 2 the packet size, packet number, and sampling rate are available in the on-router flow monitor data 226. The ethernet header length is added to the packet size in order to obtain the frame size for each packet. FIG. 5 is a flow diagram indicating one example of the operation of data validation system 204. In order to perform validation, machine pair selection component 210 intermittently identifies and selects the top K pairs of machines in the computer system architecture 100 (from the on-server monitor data) that send the most traffic in a day (or over a different time period) for data validation, as indicated by block 400 in FIG. 5. The machine pairs can be re-selected daily as machine pairing relationships may change when machines become on-line, off-line, etc.

After selecting a machine pair, data recovery component 212 uses Equation 2 to recover the on-router data for the pair, as indicated by block 402 in FIG. 5. Different labels are then applied to the recovered on-router data and on-server traffic monitor data and the data are added to the validation table 250. Adding labels to the on-server data the recovered on-router data is indicated by block 404, and adding the labeled data to the validation table is indicated by block 406. Label and comparison system 214 can then perform a direct data compare to determine whether the on-router data volume matches the on-server data volume for the pair of machines. System 214 can then generate an output indicative of the result of the comparison to indicate whether the data is validated. Performing a data compare, comparing the recovered on-router data to the on-server data is indicated by block 408, and generating a validation output indicative of the results of the comparison is indicated by block 410.

It can thus be seen that the present description describes a system which extracts features from large data sources and performs feature extraction and data splitting to reduce the size of the data. The data is aggregated to obtain component-level traffic measurement values which can be output consumer systems for monitoring, control, etc. Data validation is performed by recovering on-router data from sampled on-router data and comparing it with on-server data for different sets of machines to ensure that data has not been lost.

It will be noted that the above discussion has described a variety of different systems, components and/or logic. It will be appreciated that such systems, components and/or logic can be comprised of hardware items (such as processors and associated memory, or other processing components, some of which are described below) that perform the functions associated with those systems, components and/or logic. In addition, the systems, components and/or logic can be comprised of software that is loaded into a memory and is subsequently executed by a processor or server, or other computing component, as described below. The systems, components and/or logic can also be comprised of different combinations of hardware, software, firmware, etc., some examples of which are described below. These are only some examples of different structures that can be used to form the systems, components and/or logic described above. Other structures can be used as well.

The present discussion has mentioned processors and servers. In one example, the processors and servers include computer processors with associated memory and timing circuitry, not separately shown. The processors and servers are functional parts of the systems or devices to which they belong and are activated by, and facilitate the functionality of the other components or items in those systems.

Also, a number of user interface (UI) displays have been discussed. The UI displays can take a wide variety of different forms and can have a wide variety of different user actuatable input mechanisms disposed thereon. For instance, the user actuatable input mechanisms can be text boxes, check boxes, icons, links, drop-down menus, search boxes, etc. The mechanisms can also be actuated in a wide variety of different ways. For instance, the mechanisms can be actuated using a point and click device (such as a track ball or mouse). The mechanisms can be actuated using hardware buttons, switches, a joystick or keyboard, thumb switches or thumb pads, etc. The mechanisms can also be actuated using a virtual keyboard or other virtual actuators. In addition, where the screen on which the mechanisms are displayed is a touch sensitive screen, the mechanisms can be actuated using touch gestures. Also, where the device that displays them has speech recognition components, the mechanisms can be actuated using speech commands.

A number of data stores have also been discussed. It will be noted the data stores can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

Figure 8:
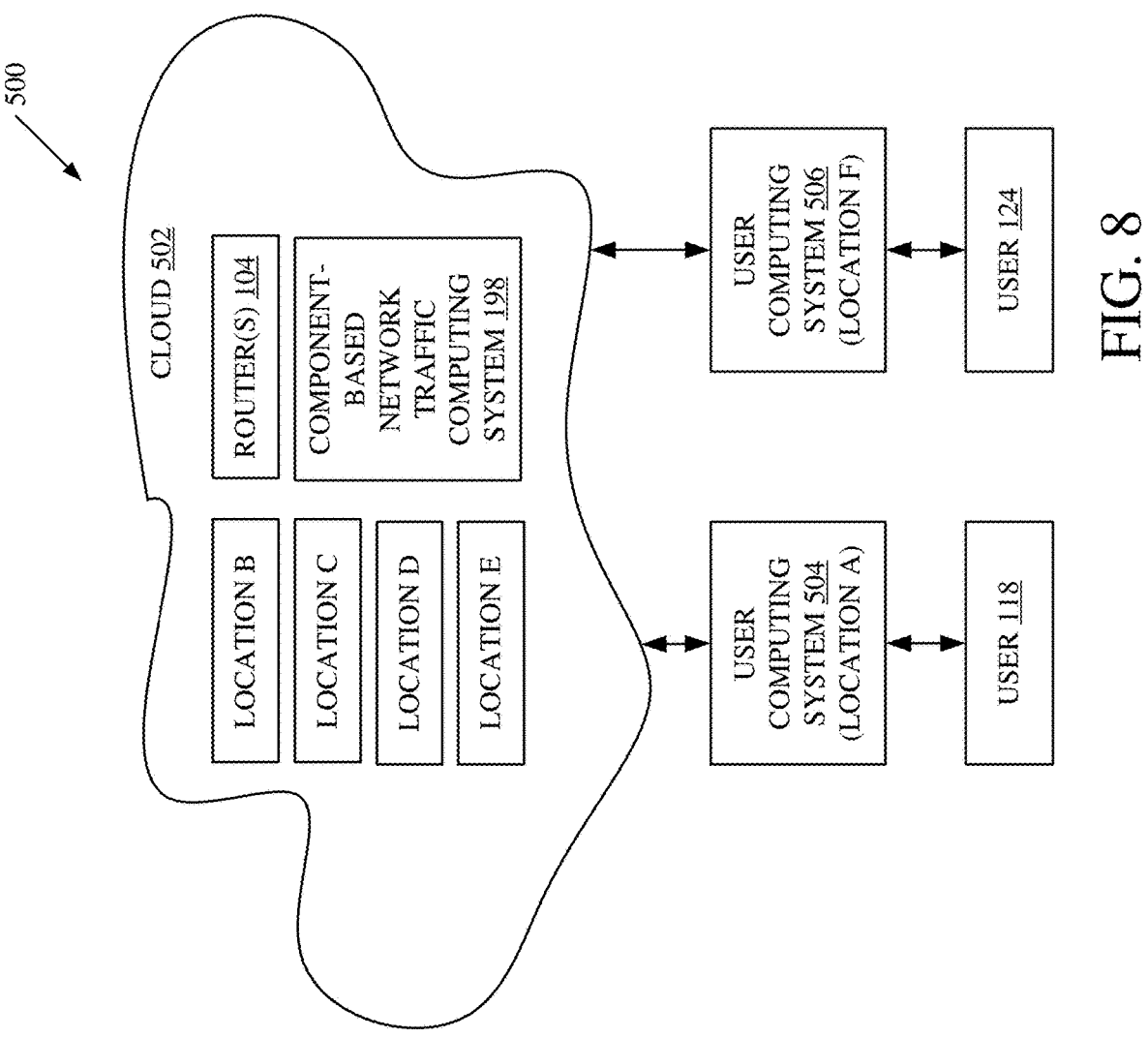
FIG. 8 is a block diagram showing one example of a remote server architecture.

FIG. 8 is a block diagram of architecture 100, shown in FIG. 1, except that its elements are disposed in a cloud computing architecture 500. Cloud computing provides computation, software, data access, and storage services that do not require end-user knowledge of the physical location or configuration of the system that delivers the services. In various embodiments, cloud computing delivers the services over a wide area network, such as the internet, using appropriate protocols. For instance, cloud computing providers deliver applications over a wide area network and they can be accessed through a web browser or any other computing component. Software or components of architecture 100 as well as the corresponding data, can be stored on servers at a remote location. The computing resources in a cloud computing environment can be consolidated at a remote data center location or they can be dispersed. Cloud computing infrastructures can deliver services through shared data centers, even though they appear as a single point of access for the user. Thus, the components and functions described herein can be provided from a service provider at a remote location using a cloud computing architecture. Alternatively, the components and functions can be provided from a conventional server, or they can be installed on client devices directly, or in other ways.

The description is intended to include both public cloud computing and private cloud computing. Cloud computing (both public and private) provides substantially seamless pooling of resources, as well as a reduced need to manage and configure underlying hardware infrastructure.

A public cloud is managed by a vendor and typically supports multiple consumers using the same infrastructure. Also, a public cloud, as opposed to a private cloud, can free up the end users from managing the hardware. A private cloud may be managed by the organization itself and the infrastructure is typically not shared with other organizations. The organization still maintains the hardware to some extent, such as installations and repairs, etc.

In the example shown in FIG. 8, some items are similar to those shown in FIG. 1 and they are similarly numbered. FIG. 8 specifically shows that the computing systems at locations B-E 102 can be located in cloud 502 (which can be public, private, or a combination where portions are public while others are private). Therefore, users 118 and 124 use user devices 504 and 506 at locations A and F to access those systems through cloud 502.

It is also contemplated that some elements of computing system architecture 102 can be disposed in cloud 502 while others are not. By way of example, data store can be disposed outside of cloud 502, and accessed through cloud 502. In another example, can be outside of cloud 502. Regardless of where the items are located, the items can be accessed directly by device 504, through a network (either a wide area network or a local area network), the items can be hosted at a remote site by a service, or the items can be provided as a service through a cloud or accessed by a connection service that resides in the cloud. All of these architectures are contemplated herein.

It will also be noted that architecture 100, or portions of it, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 9:
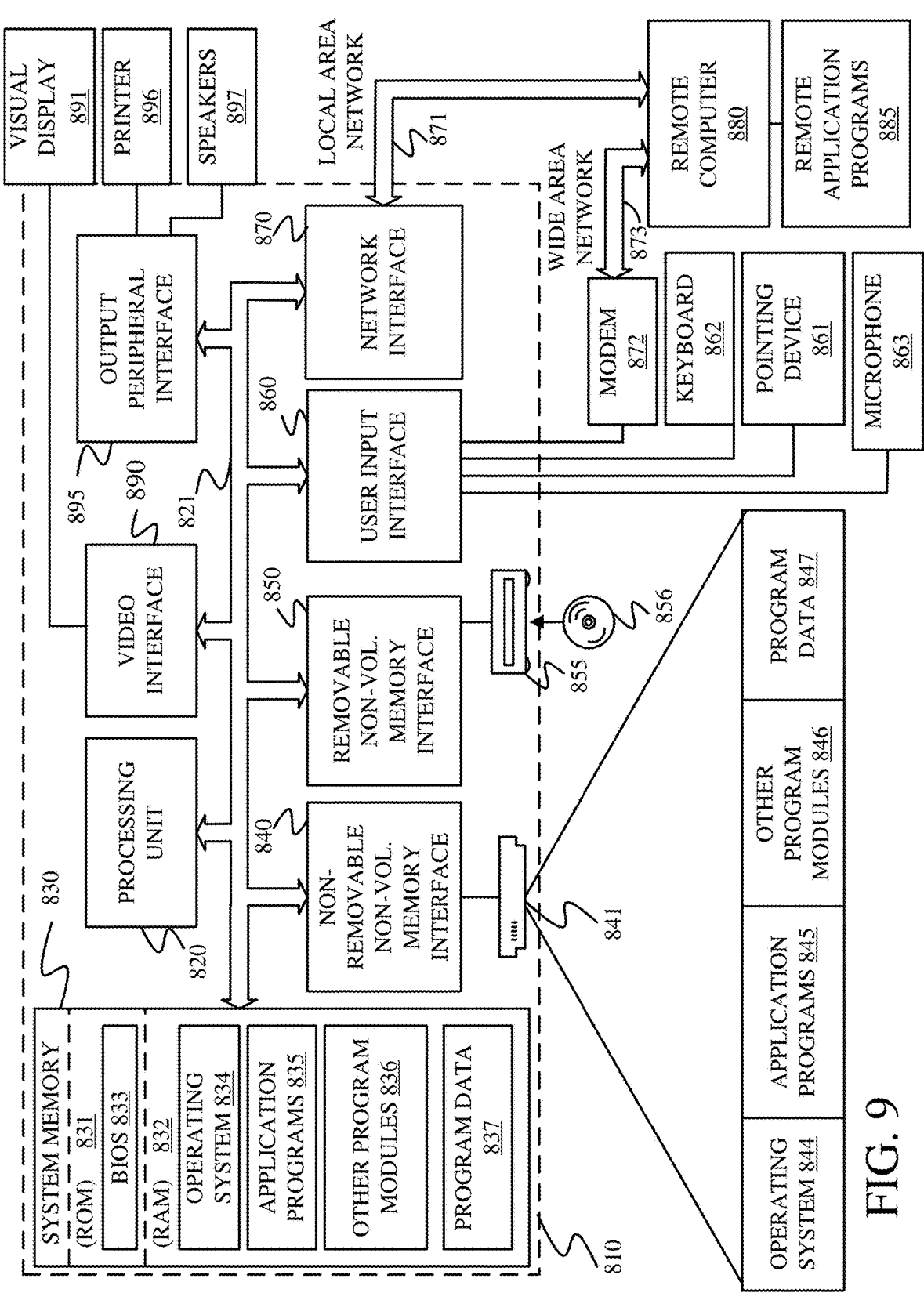
FIG. 9 is a block diagram showing one example of a computing environment.

FIG. 9 is one example of a computing environment in which architecture 100, or parts of it, (for example) can be deployed. With reference to FIG. 9, an example system for implementing some embodiments includes a computing device in the form of a computer 810 programmed to operate as discussed above. Components of computer 810 may include, but are not limited to, a processing unit 820 (which can comprise processors or servers from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus. Memory and programs described with respect to previous FIGS. can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media typically embodies computer readable instructions, data structures, program modules or other data in a transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, and an optical disk drive 855 that reads from or writes to a removable, nonvolatile optical disk 856 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837. Operating system 844, application programs 845, other program modules 846, and program data 847 are given different numbers here to illustrate that, at a minimum, they are different copies.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, or the like. These and other input devices are often connected to the processing unit 820 through a user input interface 860 that is coupled to the system bus, but may be connected by other interface and bus structures, such as a parallel port, game port or a universal serial bus (USB). A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections to one or more remote computers, such as a remote computer 880. The remote computer 880 may be a personal computer, a hand-held device, a server, a router, a network PC, a peer device or other common network node, and typically includes many or all of the elements described above relative to the computer 810. The logical connections depicted in FIG. 9 include a local area network (LAN) 871 and a wide area network (WAN) 873, but may also include other networks. Such networking environments are commonplace in offices, enterprise-wide computer networks, intranets and the Internet.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. The modem 872, which may be internal or external, may be connected to the system bus 821 via the user input interface 860, or other appropriate mechanism. In a networked environment, program modules depicted relative to the computer 810, or portions thereof, may be stored in the remote memory storage device. By way of example, and not limitation, FIG. 9 illustrates remote application programs 885 as residing on remote computer 880. It will be appreciated that the network connections shown are exemplary and other means of establishing a communications link between the computers may be used.

It should also be noted that the different examples described herein can be combined in different ways. That is, parts of one or more examples can be combined with parts of one or more other examples. All of this is contemplated herein.

Example 1 is a computer system, comprising:

at least one processor; and a data store storing computer executable instructions which, when executed by the at least one processor, cause the at least one processor to perform steps, comprising:

accessing network traffic data, indicative of a measure of network traffic, based on on-router flow monitor data indicative of network traffic running through a router, on-server traffic monitor data indicative of network traffic generated through a server, and application log data;

performing feature extraction to extract a set of features from the network traffic data;

aggregating the network traffic data based on the set of features to obtain aggregated data;

identifying a component level traffic metric indicative of network traffic attributable to a component generating at least part of the network traffic based on the aggregated data; and generating a control signal based on the component level traffic metric.

Example 2 is the computer system of any or all previous examples wherein generating a control signal comprises:

generating the control signal to performing automated network traffic control.

Example 3 is the computer system of any or all previous examples wherein generating a control signal comprises:

generating the control signal to surface the component level traffic metric through a web user interface.

Example 4 is the computer system of any or all previous examples wherein generating a control signal comprises:

generating the control signal to store the component level traffic metric to a data store.

Example 5 is the computer system of any or all previous examples wherein the network traffic includes a plurality of packets, each packet being sent from a source port, of a plurality of source ports, to a destination port, of a plurality of destination ports, in a network.

Example 6 is the computer system of any or all previous examples and further comprising:

splitting the network traffic data based on the source ports and destination ports to obtain split data.

Example 7 is the computer system of any or all previous examples wherein aggregating comprises:

aggregating the split data over the source ports and the destination ports to obtain aggregated data.

Example 8 is the computer system of any or all previous examples and further comprising:

ranking the source ports based on the aggregated data to obtain ranked source ports;

ranking the destination ports based on the aggregated data to obtain ranked destination ports; and identifying top k source ports based on the ranked source ports and a top k destination ports based on the ranked destination ports.

Example 9 is the computer system of any or all previous examples and further comprising:

filtering collection of the network traffic data based on the top k source ports and the top k destination ports.

Example 10 is the computer system of any or all previous examples and further comprising:

performing data validation on the network traffic data based on the on-router flow monitor data and the on-server traffic monitor data.

Example 11 is the computer system of any or all previous examples wherein the on-router flow monitor data comprises flow monitor data generated from network traffic data samples and wherein performing data validation comprises:

recovering additional on-router data, in addition to the network traffic data samples, to obtain recovered on-router data;

comparing the recovered on-router data to the on-server traffic monitor data to obtain a comparison result; and generating a validation output based on the comparison result.

Example 12 is the computer system of any or all previous examples wherein recovering additional router data comprises:

generating an estimate of the additional on-router data based on a data frame size, a number of packets detected in the network data samples over a sample time period, and a sampling rate at which the network data samples are sampled.

Example 13 is a computer system, comprising:

at least one processor; and a data store storing computer executable instructions which, when executed by the at least one processor cause the at least one processor to perform steps, comprising:

receiving a request for a component-level traffic volume metric indicative of network traffic attributable to an identified component running in a service;

determining whether a plurality of components run in the service; and if a plurality of components run in the service:

identifying a total port traffic metric indicative of a total number of traffic requests and responses of the plurality of components on a port used by the identified component over a time interval;

identifying a total traffic size based the total port traffic metric; and determining the component-level traffic volume metric based on the total traffic size and a relationship between the total port traffic metric and component traffic on the port used by the identified component; and generating a control signal based on the component-level traffic volume metric for the identified component.

Example 14 is the computer system of any or all previous examples and further comprising:

if a plurality of components do not run in the service, then determining the component-level traffic volume metric based on a total traffic volume metric for the service.

Example 15 is a computer implemented method, comprising:

accessing network traffic data, indicative of a measure of network traffic, based on on-router flow monitor data indicative of network traffic running through a router, on-server traffic monitor data indicative of network traffic generated through a server, and application log data;

performing feature extraction to extract a set of features from the network traffic data;

aggregating the network traffic data based on the set of features to obtain aggregated data;

identifying a component level traffic metric indicative of network traffic attributable to a component generating at least part of the network traffic based on the aggregated data; and generating a control signal based on the component level traffic metric.

Example 16 is the computer implemented method of any or all previous examples wherein generating a control signal comprises:

generating the control signal to performing automated network traffic control.

Example 17 is the computer implemented method of any or all previous examples wherein the network traffic includes a plurality of packets, each packet being sent from a source port, of a plurality of source ports, to a destination port, of a plurality of destination ports, in a network.

Example 18 is the computer implemented method of any or all previous examples and further comprising:

splitting the network traffic data based on the source ports and destination ports to obtain split data.

Example 19 is the computer implemented method of any or all previous examples wherein aggregating comprises:

aggregating the split data over the source ports and the destination ports to obtain aggregated data;

ranking the source ports based on the aggregated data to obtain ranked source ports;

ranking the destination ports based on the aggregated data to obtain ranked destination ports;

identifying top k source ports based on the ranked source ports and a top k destination ports based on the ranked destination ports; and filtering collection of the network traffic data based on the top k source ports and the top k destination ports.

Example 20 is the computer implemented method of any or all previous examples and further comprising:

performing data validation on the network traffic data based on the on-router flow monitor data and the on-server traffic monitor data.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer system, comprising:

at least one processor; and a data store storing computer executable instructions which, when executed by the at least one processor, cause the at least one processor to perform steps, comprising:

accessing network traffic data, indicative of a measure of network traffic, based on on-router flow monitor data indicative of network traffic running through a router, on-server traffic monitor data indicative of network traffic generated through a server, and application log data;

converting the on-router flow monitor data, the on-server traffic monitor data, and the application log data into a uniform format;

performing feature extraction to extract a set of features from the network traffic data;

aggregating records from different data sources based on a timestamp in the uniform format to obtain aggregated data, wherein the timestamp, an IP address pair, and a port pair identify a unique flow;

identifying a component level traffic metric indicative of network traffic attributable to a software component generating at least part of the network traffic based on the aggregated data, wherein the software component is part of a process and is a unit of functionality within a service; and generating a control signal based on the component level traffic metric.

2. The computer system of claim 1 wherein generating a control signal comprises:

generating the control signal to performing automated network traffic control.

3. The computer system of claim 1 wherein generating a control signal comprises:

generating the control signal to surface the component level traffic metric through a web user interface.

4. The computer system of claim 1 wherein generating a control signal comprises:

generating the control signal to store the component level traffic metric to a data store.

5. The computer system of claim 1 wherein the network traffic includes a plurality of packets, each packet being sent from a source port, of a plurality of source ports, to a destination port, of a plurality of destination ports, in a network.

6. The computer system of claim 5 and further comprising:

splitting the network traffic data based on the source ports and destination ports to obtain split data.

7. The computer system of claim 6 wherein aggregating comprises:

aggregating the split data over the source ports and the destination ports to obtain aggregated data.

8. The computer system of claim 7 and further comprising:

ranking the source ports based on the aggregated data to obtain ranked source ports;

ranking the destination ports based on the aggregated data to obtain ranked destination ports; and identifying top k source ports based on the ranked source ports and a top k destination ports based on the ranked destination ports.

9. The computer system of claim 8 and further comprising:

filtering collection of the network traffic data based on the top k source ports and the top k destination ports.

10. The computer system of claim 9 and further comprising:

performing data validation on the network traffic data based on the on-router flow monitor data and the on-server traffic monitor data.

11. The computer system of claim 10 wherein the on-router flow monitor data comprises flow monitor data generated from network traffic data samples and wherein performing data validation comprises:

recovering additional on-router data, in addition to the network traffic data samples, to obtain recovered on-router data;

comparing the recovered on-router data to the on-server traffic monitor data to obtain a comparison result; and generating a validation output based on the comparison result.

12. The computer system of claim 11 wherein recovering additional router data comprises:

generating an estimate of the additional on-router data based on a data frame size, a number of packets detected in the network data samples over a sample time period, and a sampling rate at which the network data samples are sampled.

13. A computer implemented method, comprising:

accessing network traffic data, indicative of a measure of network traffic, based on on-router flow monitor data indicative of network traffic running through a router, on-server traffic monitor data indicative of network traffic generated through a server, and application log data;

converting the on-router flow monitor data, the on-server traffic monitor data, and the application log data into a uniform format;

performing feature extraction to extract a set of features from the network traffic data;

aggregating records from different data sources based on a timestamp in the uniform format to obtain aggregated data, wherein the timestamp, an IP address pair, and a port pair identify a unique flow;

identifying a component level traffic metric indicative of network traffic attributable to a software component generating at least part of the network traffic based on the aggregated data, wherein the software component is part of a process and is a unit of functionality within a service; and generating a control signal based on the component level traffic metric.

14. The computer implemented method of claim 13 wherein generating a control signal comprises:

generating the control signal to performing automated network traffic control.

15. The computer implemented method of claim 13 wherein the network traffic includes a plurality of packets, each packet being sent from a source port, of a plurality of source ports, to a destination port, of a plurality of destination ports, in a network.

16. The computer implemented method of claim 15 and further comprising:

splitting the network traffic data based on the source ports and destination ports to obtain split data.

17. The computer implemented method of claim 16 wherein aggregating comprises:

aggregating the split data over the source ports and the destination ports to obtain aggregated data;

ranking the source ports based on the aggregated data to obtain ranked source ports;

ranking the destination ports based on the aggregated data to obtain ranked destination ports;

identifying top k source ports based on the ranked source ports and a top k destination ports based on the ranked destination ports; and filtering collection of the network traffic data based on the top k source ports and the top k destination ports.

18. The computer implemented method of claim 17 and further comprising:

performing data validation on the network traffic data based on the on-router flow monitor data and the on-server traffic monitor data.

* * * * *